July 14, 1964  F. M. MAYES  3,140,609

SIGNAL TRANSMITTING AND CONTROL SYSTEM

Filed Nov. 8, 1956  3 Sheets-Sheet 1

INVENTOR.
FRED M. MAYES
BY
ATTORNEYS

July 14, 1964 F. M. MAYES 3,140,609
SIGNAL TRANSMITTING AND CONTROL SYSTEM
Filed Nov. 8, 1956 3 Sheets-Sheet 3

INVENTOR.
FRED M. MAYES
BY

ATTORNEYS

United States Patent Office 3,140,609
Patented July 14, 1964

3,140,609
SIGNAL TRANSMITTING AND CONTROL SYSTEM
Fred M. Mayes, Richardson, Tex., assignor to Sun Oil
Company, Philadelphia, Pa., a corporation of New
Jersey
Filed Nov. 8, 1956, Ser. No. 621,112
18 Claims. (Cl. 73—311)

This invention relates to a signal transmitting and control system and has particular reference to the solution of problems arising in the matter of gauging tanks.

When large numbers of tanks are grouped as in the so-called tank farms, it is often a requirement that gauging records should be made at some point remote from the tank group and also that all of the tanks be gauged substantially simultaneously, as, for example, at regular intervals of time. Obviously, if each tank is connected permanently and individually with the location where recording or indicating is to be effected, an elaborate system of cables would be required. If, on the other hand, a switching arrangement is located in the midst of the group of tanks arranged to switch them serially into connection with the recording station, the gauging, if conventional arrangements were used, would involve the making of successive measurements of the various tanks with the result that there would not be simultaneity in time of the readings. Any such switching system requires, at best, a substantial time interval for the gauging and recording with respect to each tank. Even in this last mentioned instance considerable complexity of wiring is involved if controls of mechanical elements at the tanks are required.

In my prior applications, Serial Nos. 493,367 now Patent No. 2,899,751 and 506,056, now Patent No. 2,930,131 filed, respectively, March 10, 1955 and May 4, 1955, and in a joint application of Jones and myself, Serial No. 611,291 now Patent No. 3,034,217, filed September 21, 1956, there are disclosed tank gauging means of particularly advantageous types for the highly accurate gauging of tanks. Reference may be made particularly to the joint application last mentioned which shows a preferred form of system involving the ultimate securing of printed records of the level or quantity of material in a tank. As described in said joint application, there is a mechanical and electrical cycle involved in the gauging of a tank. In the cycle of float member is raised relative to a liquid surface in the tank, and is then relowered to its original position. A signal is emitted at the instant that the float either leaves or enters the liquid, and during the progress of float movement pulses are emitted providing signals indicative of the level or quantity of liquid in the tank. The pulses are emitted on two channels and at certain intervals of the measuring range signals are emitted simultaneously on the two channels. Through suitable decoding means the signals which are thus provided are caused to operate either indicating or recording means, which latter may be conventional.

It will be evident from what has been briefly outlined that at the tank there must be provision for power operation of the mechanical and electrical devices, provision for cycle control, and provision for the transmission from the tank of signals on at least two channels. The power supply and control conceivably could be provided merely by the selective supply of power if the cycle of operation of the gauging means was then to occur automatically. However, if there was a group of tanks this would necessarily mean for practical operation that their cycles would take place successively so as to avoid confusion of the signals transmitted to the recording location. In any event, the type of system just indicated, even with selective switching at some central point, would ordinarily involve multiple conductor cables which, considering the large distance frequently existing between tanks and between them and a recording station, would be prohibitive in cost.

It is the general object of the present invention to reduce to a minimum the number of conductors required to associate tanks of a group with a central recording or reading station.

A further object of the invention is the provision of a system whereby a large number of tanks may be simultaneously read, the reading being thereafter followed by transmission serially of the information corresponding to the individual tanks. Still further objects of the invention are concerned with simple controlling means for the control of mechanical and/or electrical cycles at remote points and in particular consistently with the provision of returned signals to the central station from which control is effected.

These and other objects of the invention, particularly relating to details of construction and operation, will become apparent from the following description, read in conjunction with the accompanying drawings in which.

Figure 1:
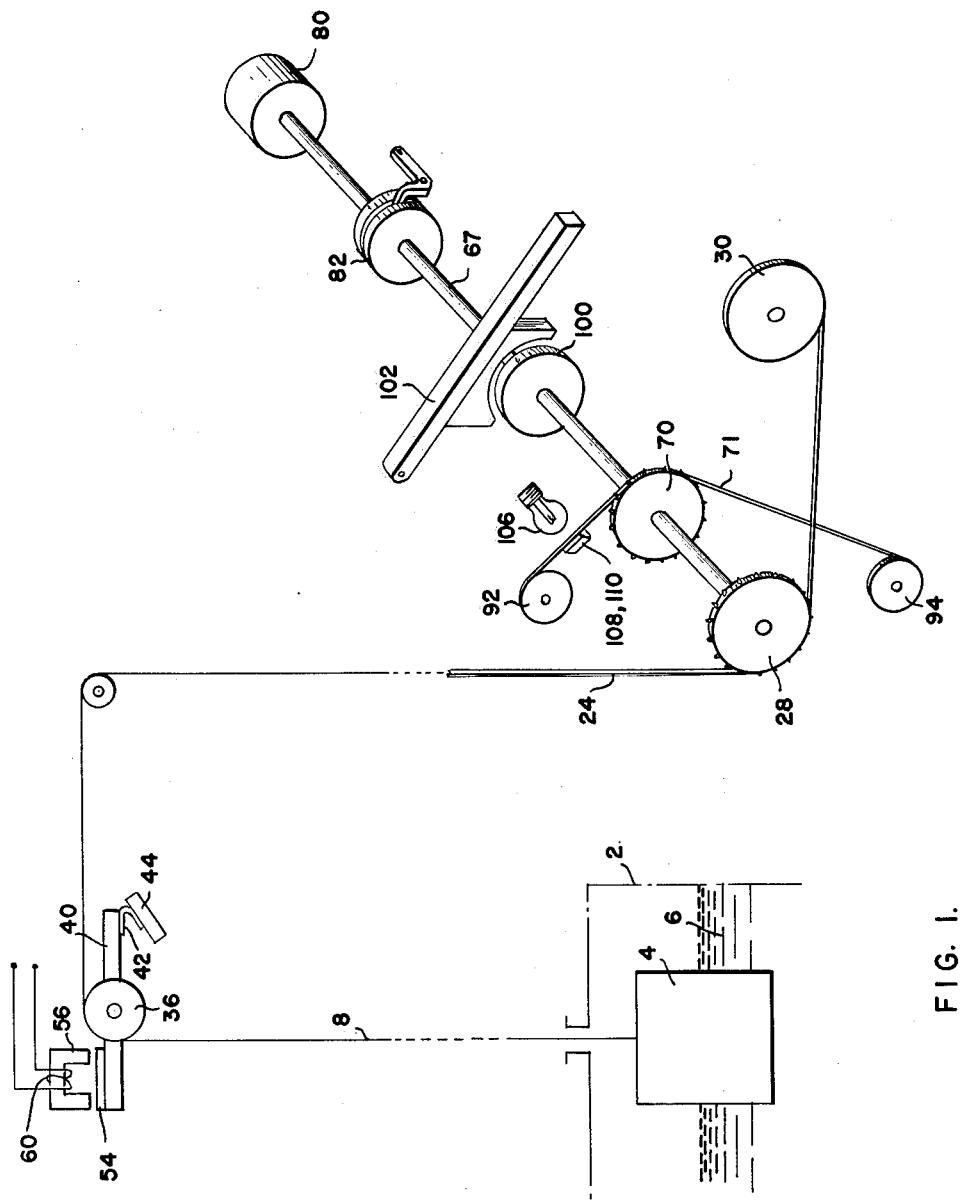
FIGURE 1 is a diagrammatic view, partly in perspective, showing various mechanical and electrical elements associated with a tank for the purpose of gauging quantity of liquid therein.

Referring first to FIGURE 1 there are illustrated therein the basic elements associated with a single tank in the gauging arrangement which is shown and described in detail in said joint application. Reference to the latter may be made for structural and electrical details, but the present invention is not concerned with these, and for simplicity the elements associated with the tank are only diagrammed in conventionalized form.

A tank is indicated at 2. Located within this is a float 4 buoyed by a liquid 6 within the tank and connected to a cable 8 which passes upwardly, then horizontally, and then downwardly, being continued at 24 as a perforated tape which is trained about a sprocket 28 and taken up by a spring motor 30, desirably of the type which involves the application of an approximately constant tension irrespective of the amount of tape 24 which is wound up.

In its progress as just described the cable 8 passes over a pulley 36 which is mounted on a lever 40 having an effective pivotal mounting by reason of the provision of a spring connection 42 with a fixed supporting member 44. The lever 40 carries a permanent magnet 54 which moves relative to the pole pieces of a core 56 on which there is a winding 60, the arrangement being such that as the lever 40 deflects the degree of magnetic saturation of the core 56 varies with resultant change in the inductance exhibited by the coil 60.

Secured to the sprocket 28 so as to rotate therewith there is a sprocket 70 arranged to drive a photographic film 71 containing two channels of coded transparent areas arranged to pass between a lamp 106 and a pair of phototransistors 108 and 110, one of these corresponding to each channel on the film. Takeup and supply reels are provided at 92 and 94. A shaft arrangement 67 which drives the sprockets is driven from a motor 80 through a clutch 82 which is controlled by a solenoid 90, the clutch being engaged when the solenoid is energized.

All of the elements so far described diagrammatically correspond to elements in said joint application and bear corresponding reference numerals. In addition, in accordance with the present invention, there is provided on the shaft 67 a drum 100 which cooperates with a lever 102 provided with a brakeshoe which is arranged to hold the shaft 67 in fixed position despite the attempt of motor 80 to continue drive thereof. As described in said joint application, the motor 80 is only required to do a small amount of work and may be of a very low power induction type which may be mechanically stalled without damage. Thus the shaft 67 may be arrested despite the fact that power is applied to the motor 80.

Figure 2:
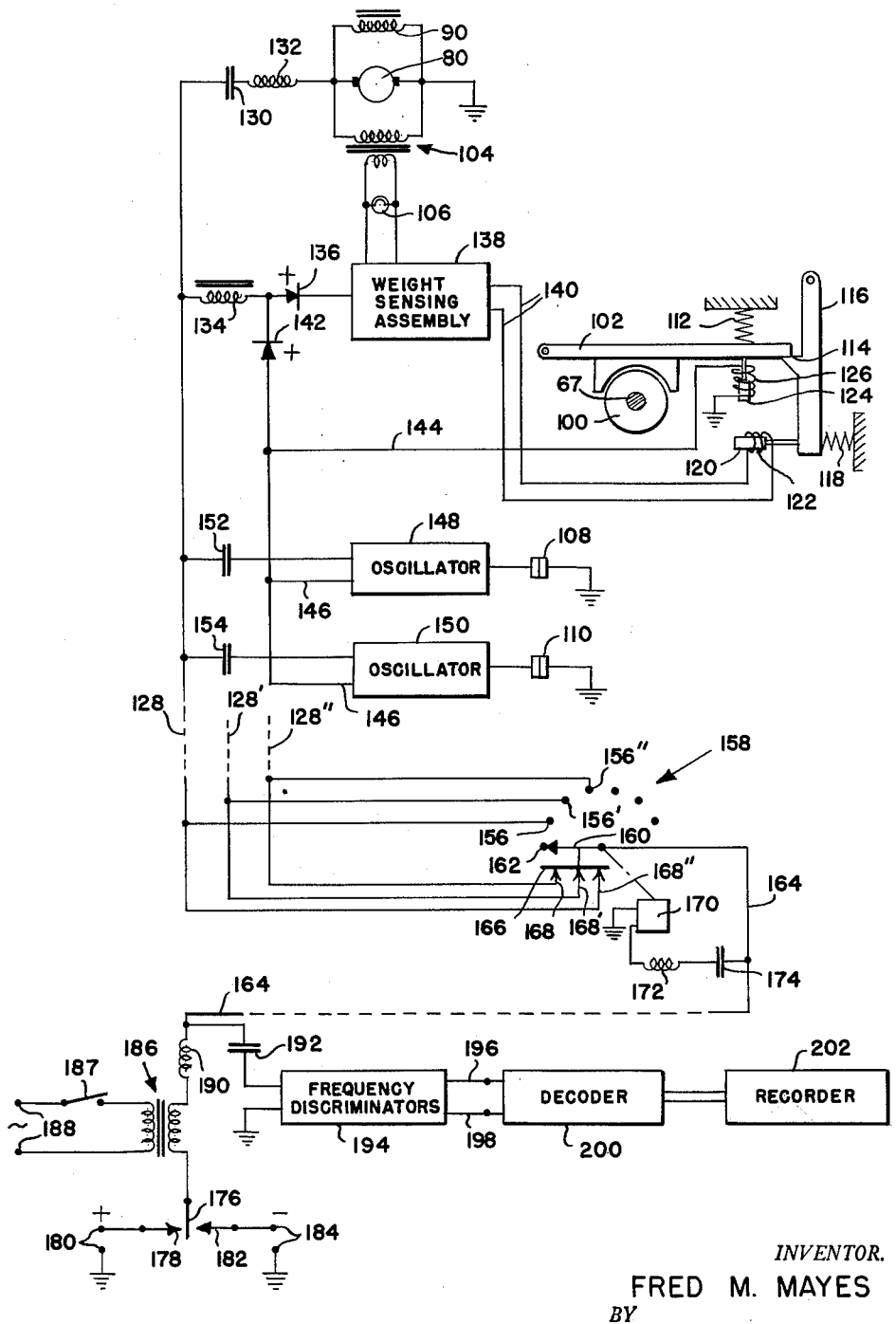
FIGURE 2 is a mechanical and wiring diagram showing the means whereby apparatus of the type illustrated in FIGURE 1 may be controlled and caused to provide records at a remote point.

Reference may now be made to FIGURE 2. The controlling arrangements for the brake lever 102 are illustrated therein, the lever being urged downwardly toward braking position by a spring 112 but ordinarily held out of such position by a pivoted detent 116 having a shoulder 114 underlying the end of the lever, a spring 118 serving to hold the detent 116 toward the left as viewed in FIGURE 2. A plunger 120 is arranged to be acted upon by a solenoid 122 to trip the detent 116 against the action of spring 118. Under these conditions the spring 112 may force the lever 102 downwardly to effect braking action on the shaft 67. To interrupt the braking action and restore the lever, the lever is provided with a plunger 124 adapted to be acted upon by a solenoid 126, with the result that when the solenoid is energized the lever 102 is forced upwardly to pass above the shoulder 114, the spring 118 then moving the detent to active position in view of the fact that under these circumstances the solenoid 122 will be deenergized.

There is indicated at 128 a conductor which extends from a particular tank, the elements of which are illustrated, to a switching station at which there is located a switch 158. It may be assumed for simplicity that the return circuit is actually grounded, though in practice the return for the connection 128 would generally be carried as a second wire in a cable. In any event there would at most be required running from the tank to the location of the switch 158 a two-wire cable. Other conductors corresponding to 128 are indicated at 128' and 128'' and are representative of what may be a large number of conductors running to a corresponding large number of tanks. In the case of a tank farm the switch 158 could be located at such position that the conductors 128 (or cables) running therefrom to the individual tanks would have a minimum length. As will more fully appear hereafter, a complete installation involves the running of only a single conductor (or cable) from the switch 158 to the control and recording station which may be far remote from the group of tanks, and which in fact may serve a number of tank groups.

Considering, now, what is associated with a single tank, the conductor 128 is connected through a capacitor 130 and a high frequency choke 132 to the solenoid winding 90 which controls the clutch 82, to the motor 80, and to the primary of a transformer 104 which supplies filament current to the lamp 106 and which may also supply filament heating current for tubes which may be in the weight sensing assembly 138.

The line 128 is connected through a choke 134 to a pair of diodes 136 and 142 which are oppositely disposed with respect to their connection with the choke 134. The cathode of the diode 136 is illustrated as connected to the weight sensing assembly 138, from which an output is provided at 140 to the solenoid 122 which serves for the tripping of the detent 116.

Figure 3:
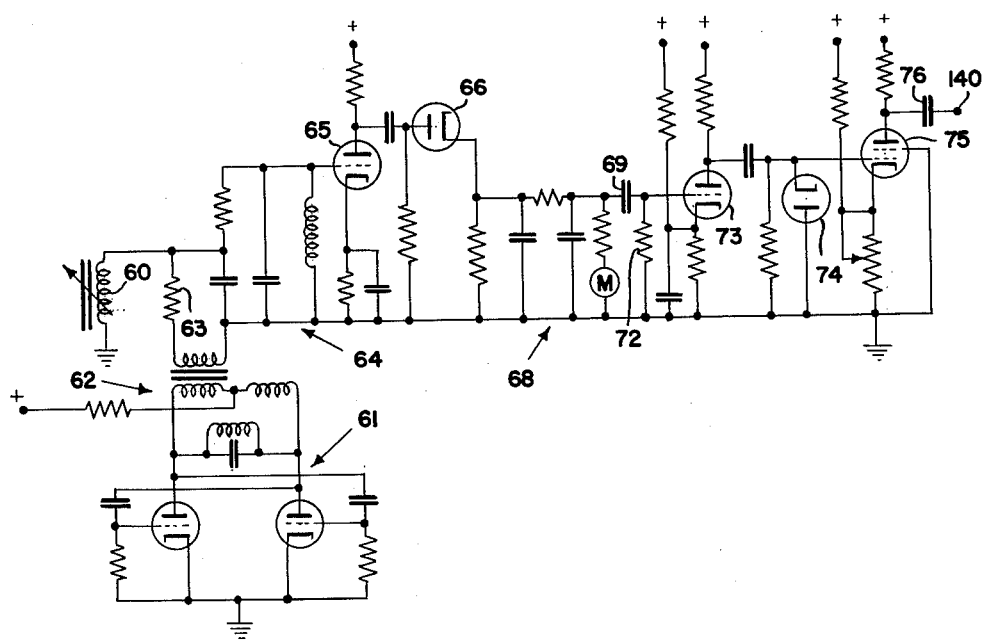
FIGURE 3 is a wiring diagram showing the portion of the apparatus which gives rise to signals dependent upon the relationship of the float to the liquid in a tank.

FIGURE 3 shows the circuit used for the detection of emergence of the float from the liquid, the circuit being that which forms the assembly 138 of FIGURE 2. An oscillator of conventional type indicated at 61 supplies alternating current at a suitable frequency (for example 1,000 cycles per second, though the frequency is not at all critical) through a transformer 62 and resistor 63 to the winding 60 of the variable inductance arrangement already described. The junction of resistor 63 and winding 60 provides an input to the tuned circuit 64 which is tuned to the oscillator frequency. The signal across the tuned circuit is amplified by the triode 65 and its conventional connections and is then rectified by diode 66 followed by the filter 68 which eliminates the alternating component. The varying D.C. signal is then subject to differentiation by the arrangement of capacitor 69 and resistor 72 and the differentiated signal is then amplified by triode 73 in a conventional amplifying circuit. The output signal from this amplifier is fed to the clamping diode 74 and to the control grid of a thyratron 75, the anode of which is connected through a large capacitor 76 to a terminal connected to one of the leads 140, the other of which is grounded, the leads being connected to the solenoid 122, the solenoid being energized by the discharge of the capacitor 76 through the thyratron when the latter fires.

The change of voltage at the output of the filter 68 is approximately proportional to the displacement of the magnet 54 which controls the effective inductance of the winding 60 by control of the degree of saturation of the core 56. As soon as the float emerges from the liquid, the output voltage from the filter 68 levels off at a fixed value and the differentiator converts this event to a negative signal. The amplifier 73 inverts the phase of the signal and provides a positive output which fires the thyratron. During the period of rise of the float a negative signal appears at the amplified output and is clamped by the diode 74 at ground potential.

Diode 142 supplies negative potential through connection 144 to the solenoid winding 126 for the purpose of disengaging the brake and restoring the brake system to its initial condition. The diode 142 also supplies current through connections 146 to a pair of oscillators 148 and 150 which are connected to the phototransistors 108 and 110 in conventional fashion so that the phototransistors effect modulation of the oscillators. The oscillators are operated at substantially different frequencies, which may be in the high audio frequency or low radio frequency range, with the resulting production of pulse trains depending upon the conditions of illumination or non-illumination of the phototransistors. The pulse trains are emitted to the line 128 through the capacitors 152 and 154. Considering the elements which have been described, it may now be pointed out that the capacitor 130 is arranged to block direct current from the winding 90, the motor 80 and the primary of transformer 104, while the choke 132 is arranged to block the frequencies from the oscillators 148 and 150 from the same elements, the capacitor 130 and choke 132, however, offering free passage for the power frequency which may be the conventional 60 cycle supply. The choke 134 is of such size as to substantially block both the power frequency and the frequencies resulting from the oscillators 148 and 150 from the diodes 136 and 142. A positive supply to the line 128 flows through diode 136 to supply the weight sensing assembly 138 but this supply is blocked by diode 142. Conversely, a negative supply to line 128 is blocked by diode 136 but delivered through diode 142 to the connection 144 and through connections 146 to provide power supplies for the oscillators 148 and 150. It may be remarked that the oscillators 148 and 150 may be of transistor type, but if of vacuum tube type, the tube heaters or filaments may be either supplied with direct current or by alternating current from the transformer 104.

The switch 158 is designed to provide, first, for the simultaneous supply of power to all of the tanks of the group to be gauged and secondly in sequence to only individual tanks, with reception of signals therefrom. As shown, the contact 156 engageable by the stepping arm 160 of switch 158 is connected to the line 128 already discussed, while the succeeding contacts 156', 156'', etc., are connected to the respective corresponding lines for other tanks 128', 128'', etc. In its "home" position the arm 160 engages the (inactive) contact 162, and at the same time controls a switch indicated at 166 which simultaneously electrically connects the arm 160 to all of the lines through the contacts 168, 168', 168'', etc. These contacts are not engaged after the switch 160 moves from its home position. The wiper 160 of the switch is connected by a single conductor 164 (which may be associated with a return ground conductor in a cable) to the recording station which is indicated by those elements associated with the left hand end of the line 164 in FIGURE 2. Connected to conductor 164 adjacent to the switch 158 through a capacitor 174, which blocks direct current, and through a high frequency choke 172, which blocks currents from the oscillators 148 and 150, is the stepping solenoid 170 of the stepping switch. Desirably this is of the well known type in which stepping occurs under spring action each time the solenoid 170 is deenergized, though it will be evident that arrangements may be changed to accommodate the use of other types of stepping or sequential switches.

The recorder end of the conductor 164 is connected through the high frequency choke 190 to the secondary of an alternating power supplying transformer 186, the primary of which may be connected to the commercial supply terminals 188 through a switch 187. The other end of the secondary winding is connected to a switch 176 which is arranged for selective contact with terminal 178 of a positive power supply indicated at 180 or with the terminal 182 of a negative power supply indicated at 184. As will shortly appear, the switching arrangements just described are such that alternating current and direct current selectively chosen as to direction may be provided simultaneously through the switch 158 to the lines 128 passing to the individual tanks. The choke 190 prevents the high frequency signals from oscillators 148 and 150 from being grounded through the power supplies. These signals, however, are delivered through capacitor 192 to frequency discriminators 194 which may be of conventional type providing outputs at 196 and 198 corresponding, respectively, to signals received from the oscillators 148 and 150. These signals may be either positive or negative or, if desired, of opposite signs for feed to a decoder indicated at 200 which may be of the type described in detail in said joint application, receiving in the present case at 196 and 198 signals such as those supplied directly from photo-transistors in said joint application. (See FIGURE 10 thereof.) The decoder, provided with relays selectively responsive to the various combinations of signals received at 196 and 198 provides its output to a recorder 202 which may be an indicator or a printing recorder as described in detail in said joint application.

It will not be necessary in this application to go into the details of the coding or decoding arrangements which are fully described in said joint application. The operation of the present apparatus may now be described.

Assuming the stepping switch 158 to be in home position, the line 164 running between this switch and the recording station is connected to all of the lines 128 running from the switch 158 to the individual tank gauging assemblies. To initiate operation the switch 187 is closed and the switch 176 is thrown to the left to supply positive current through line 164 and through all of the lines 128 to the tank assemblies. As a result of this the weight sensing assembly 138 is energized, clutch 82 is engaged, and motor 80 is started to raise the float 4. As the weight rises the load on the lever 40 steadily increases changing the inductance of the coil 60. However, no event of significance occurs until the float 4 breaks from the surface of the liquid 6 whereupon, as described in said joint application the thyratron in assembly 138 fires with the result, in the present case, that the detent 116 is tripped causing the brake to arrest the shaft 67.

The result of the foregoing is that in all of the tanks the floats 4 are substantially simultaneously raised to positions just clearing the liquids in the various tanks, with the result that the position of the float, and of the film 71 corresponding to each tank represents the level or quantity of liquid in the tank. The position thus attained is held until the information is read out, the reading out occurring in succession for the various tanks. The alternating current supply is maintained for a sufficient time for the float to rise from the liquid in each of the tanks, which times is only a matter of relatively few seconds. The switch 187 is then opened, the result being an advance of the selector switch 158 to the next position which, in the case illustrated, provides contact between wiper 160 and contact 156 connecting only the line 128 to the line 164. The switch 187 is again closed, and after a delay of a few seconds, involving, in particular, the attainment of full illumination of the lamp 106, negative potential is applied by movement of switch 176 into engagement with terminal 182. The negative power thus supplied through diode 142 energizes the solenoid 126 releasing the brake from the shaft 67 which then continues to rotate in the direction of lifting further the float 4, the motor 80 and the clutch solenoid 90 being energized. The film 71 is accordingly advanced past the photocells 108 and 110 to give rise to pulse trains from the oscillators 148 and 150 which pass through capacitors 152 and 154 and lines 128 and 164 to the frequency discriminators 194 to give rise to pulse sequences which are decoded and recorded as described in connection with said joint application. If manual operation of the switches is involved sufficient time may be allowed before the switches 187 and 176 are opened for complete recording or indication to take place. However, it will be evident that the recorder itself, following reception of full information, may open these switches to effect a stepping of the stepping switch to the next contact 156' whereupon switches may be closed as before to effect reading out of the information established in the second tank. This operation may, of course, be repeated as many times as required to cover the entire number of tanks, with the final restoration of the switch wiper 160 to its home position. It may be noted that after read out is accomplished and the alternating supply is removed, the clutch 82 will be disengaged, and since the brake will also be disengaged the float is free to drop to its initial position in each tank in sequence.

It may be noted that a single recording station may be switched to a number of lines corresponding to 164 in the event that a number of tank groups are to be gauged. In such case simple switching of all of the lines 164 initially to the power supply when their corresponding switches 158 are in home position will produce movements of the floats in all of the tanks in all of the groups simultaneously to secure readings as of the same time. Then by suitable switching, which will be obvious, of the various lines 164, the tanks of the various groups may be read sequentially.

The advantages of the invention will now be apparent. Single lines 128 containing at most two conductors provide the connections from the individual tanks to a simple stepping switch arrangement which may be located most conveniently and economically in the midst of a group of tanks. From this switch another single line containing at most two conductors runs to the recording station which may be at great distance from the group of tanks. Over these simple lines selective controls are exercised and differentiated signals transmitted by the utilization of alternating current and direct current of opposite polarities together with the use of different frequencies to discriminate between sets of signals.

Provision is also made in accordance with the invention to secure indications of conditions in any desired number of tanks essentially simultaneously with provision for delayed sequential read out of the information. While the invention is particularly applicable to level or quantity measurements in tanks, it will be evident that the invention is even broader since other variables may be similarly measured. It will be clear that if simultaneous values are not required to be measured, but measurements need only be made sequentially, the apparatus herein disclosed may be substantially simplified. It will be evident that various details may be changed without departing from the invention as defined in the following claims.

What is claimed is:

1. In combination, a plurality of signal originating stations, switching means, means providing an individual single transmitting channel comprising only two conductive paths between each of said stations and said switching means, means supplying alternating power current through said switching means and transmitting channels selectively to said stations, means supplying direct control currents through said switching means and the same transmitting channels selectively to said stations, indicating means connected to said switching means, and means in said originating stations controlled by said power current and said control currents for selectively providing high frequency signals through the same transmitting channels and said switching means to said indicating means.

2. In combination, a plurality of signal originating stations, switching means, means providing an individual single transmitting channel comprising only two conductive paths between each of said stations and said switching means, means supplying power current through said switching means and transmitting channels selectively to said stations, means supplying control currents different from said power current through said switching means and the same transmitting channels selectively to said stations, indicating means connected to said switching means, and means in said originating stations controlled by said power current and said control currents for selectively providing a plurality of different high frequency signals through the same transmitting channels and said switching means to said indicating means.

3. In combination, a plurality of signal originating stations each of which includes a moving means, means for sensing a condition achieved by operation of said moving means, means controlled by said sensing means for interrupting the action of said moving means, and means providing sequential signals indicative of position attained by said moving means, switching means, indicating means connected to said switching means, means providing an individual transmitting channel between each of said stations and said switching means, means supplying power current and signal current through said switching means and transmitting channels simultaneously to said stations, thereby to effect operation of said moving means, sensing means and interrupting means, in all of said stations, and means supplying power current and signal current through said switching means and transmitting channels selectively to said stations, thereby to effect operation of said signal providing means to provide signals indicative of positions attained by said moving means through said transmitting channels and switching means to said indicating means.

4. In combination, a plurality of signal originating stations each of which includes a moving means, means for sensing a condition achieved by operation of said moving means, means controlled by said sensing means for interrupting the action of said moving means, and means providing high frequency sequential signals indicative of position attained by said moving means, switching means, indicating means connected to said switching means, means providing an individual transmitting channel between each of said stations and said switching means, means supplying power current and signal current through said switching means and transmitting channels simultaneously to said stations, thereby to effect operation of said moving means, sensing means and interrupting means, in all of said stations, and means supplying power current and signal current through said switching means and transmitting channels selectively to said stations, thereby to effect operation of said signal providing means to provide high frequency signals indicative of positions attained by said moving means through said transmitting channels and switching means to said indicating means.

5. In combination, a plurality of signal originating stations each of which includes a moving means, means for sensing a condition achieved by operation of said moving means, means controlled by said sensing means for interrupting the action of said moving means, and means providing sequential signals indicative of position attained by said moving means, switching means, indicating means connected to said switching means, means providing an individual transmitting channel between each of said stations and said switching means, means supplying alternating power current and direct signal current through said switching means and transmitting channels simultaneously to said stations, thereby to effect operation of said moving means, sensing means and interrupting means, in all of said stations, and means supplying alternating power current and direct signal current of a sign opposite the first mentioned direct signal current through said switching means and transmitting channels selectively to said stations, thereby to effect operation of said signal providing means to provide signals indicative of positions attained by said moving means through said transmitting channels and switching means to said indicating means.

6. In combination, a plurality of signal originating stations each of which includes a moving means, means for sensing a condition achieved by operation of said moving means, means controlled by said sensing means for interrupting the action of said moving means, and means providing high frequency sequential signals indicative of position attained by said moving means, switching means, indicating means connected to said switching means, means providing an individual transmitting channel between each of said stations and said switching means, means supplying alternating power current and direct signal current through said switching means and transmitting channels simultaneously to said stations, thereby to effect operation of said moving means, sensing means and interrupting means, in all of said stations, and means supplying alternating power current and direct signal current of a sign opposite the first mentioned direct signal current through said switching means and transmitting channels selectively to said stations, thereby to effect operation of said signal providing means to provide high frequency signals indicative of positions attained by said moving means through said transmitting channels and switching means to said indicating means.

7. In combination, a plurality of signal originating stations each of which includes a moving means, means for sensing a condition achieved by operation of said moving means, means controlled by said sensing means for interrupting the action of said moving means, and means providing plurality of different high frequency sequential signals indicative of position attained by said moving means, switching means, indicating means connected to said switching means, means providing an individual transmitting channel between each of said stations and said switching means, means supplying power current and signal current through said switching means and transmitting channels simultaneously to said stations, thereby to effect operation of said moving means, sensing means and interrupting means, in all of said stations, and means supplying power current and signal current through said switching means and transmitting channels selectively to said stations, thereby to effect operation of said signal providing means to provide plurality of different high frequency signals indicative of positions attained by said moving means through said transmitting channels and switching means to said indicating means, said indicating means including means for discriminating said high frequency signals.

8. In combination, a plurality of signal originating stations each of which includes a moving means, means for sensing a condition achieved by operation of said moving means, means controlled by said sensing means for interrupting the action of said moving means, and means providing plurality of different high frequency sequential signals indicative of position attained by said moving means, switching means, indicating means connected to said switching means, means providing an individual transmitting channel between each of said stations and said switching means, means supplying alternating power current and direct signal current through said switching means and transmitting channels simultaneously to said stations, thereby to effect operation of said moving means, sensing means and interrupting means, in all of said stations, and means supplying alternating power current and direct signal current of a sign opposite the first mentioned direct signal current through said switching means and transmitting channels selectively to said stations, thereby to effect operation of said signal providing means to provide plurality of different high frequency signals indicative of positions attained by said moving means through said transmitting channels and switching means to said indicating means, said indicating means including means for discriminating said high frequency signals.

9. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing sequential signals indicative of the position attained by said member, switching means, indicating means connected to said switching means, means providing an individual transmitting channel between each of said stations and said switching means, means supplying power current and signal current through said switching means and transmitting channels simultaneously to said stations, thereby to effect movement of said members and operation of said sensing means and interrupting means in all of said stations, and means supplying power current and signal current through said switching means and transmitting channels selectively to said stations, thereby to effect operation of said signal providing means to provide signals indicative of positions attained by said members through said transmitting channels and switching means to said indicating means.

10. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing high frequency sequential signals indicative of the position attained by said member, switching means, indicating means connected to said switching means, means providing an individual transmitting channel between each of said stations and said switching means, means supplying power current and signal current through said switching means and transmitting channels simultaneously to said stations, thereby to effect movement of said members and operation of said sensing means and interrupting means in all of said stations, and means supplying power current and signal current through said switching means and transmitting channels selectively to said stations, thereby to effect operation of said signal providing means to provide high frequency signals indicative of positions attained by said members through said transmitting channels and switching means to said indicating means.

11. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing sequential signals indicative of the position attained by said member, switching means, indicating means connected to said switching means, means providing an individual transmitting channel between each of said stations and said switching means, means supplying alternating power current and direct signal current through said switching means and transmitting channels simultaneously to said stations, thereby to effect movement of said members and operation of said sensing means and interrupting means in all of said stations, and means supplying alternating power current and direct signal current of a sign opposite the first mentioned direct signal current through said switching means and transmitting channels selectively to said stations, thereby to effect operation of said signal providing means to provide signals indicative of positions attained by said members through said transmitting channels and switching means to said indicating means.

12. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing high frequency sequential signals indicative of the position attained by said member, switching means, indicating means connected to said switching means, means providing an individual transmitting channel between each of said stations and said switching means, means supplying alternating power current and direct signal current through said switching means and transmitting channels simultaneously to said stations, thereby to effect movement of said members and operation of said sensing means and interrupting means in all of said stations, and means supplying alternating power current and direct signal current of a sign opposite the first mentioned direct signal current through said switching means and transmitting channels selectively to said stations, thereby to effect operation of said signal providing means to provide high frequency signals indicative of positions attained by said members through said transmitting channels and switching means to said indicating means.

13. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing plurality of different high frequency sequential signals indicative of the position attained by said member, switching means, indicating means connected to said switching means, means providing an individual transmitting channel between each of said stations and said switching means, means supplying power current and signal current through said switching means and transmitting channels simultaneously to said stations, thereby to effect movement of said members and operation of said sensing means and interrupting means in all of said stations, and means supplying power current and signal current through said switching means and transmitting channels selectively to said stations, thereby to effect operation of said signal providing means to provide plurality of different high frequency signals indicative of positions attained by said members through said transmitting channels and switching means to said indicating means, said indicating means including means for discriminating said high frequency signals.

14. In combination, a plurality of signal originating stations each of which includes a liquid-containing tank, a member movable relatively to a surface of liquid in the tank, means for sensing a predetermined relationship achieved by the member relatively to said surface, means controlled by said sensing means for interrupting movement of said member, and means providing plurality of different high frequency sequential signals indicative of the position attained by said member, switching means, indicating means connected to said switching means, means providing an individual transmitting channel between each of said stations and said switching means, means supplying alternating power current and direct signal current through said switching means and transmitting channels simultaneously to said stations, thereby to effect movement of said members and operation of said sensing means and interrupting means in all of said stations, and means supplying alternating power current and direct signal current of a sign opposite the first mentioned direct signal current through said switching means and transmitting channels selectively to said stations, thereby to effect operation of said signal providing means to provide plurality of different high frequency signals indicative of positions attained by said members through said transmitting channels and switching means to said indicating means, said indicating means including means for discriminating said high frequency signals.

15. In combination, a plurality of signal originating stations each of which includes a liquid-containing tank, a member movable relatively to a surface of liquid in the tank, means for so moving said member, means for sensing a predetermined relationship achieved by the member relatively to said surface, and means controlled by said sensing means for retaining information identifying the position of said member at the time of occurrence of said predetermined relationship irrespective of change of level of said surface of liquid thereafter; and means for sequentially providing from said stations, following attainment by the members of all of them of said predetermined relationships, and while said information is retained by a plurality of said information retaining means, signals indicative of said positions of the members.

16. In combination, a signal originating station which includes a liquid-containing tank, a member movable relatively to a surface of liquid in the tank, means for so moving said member, means for sensing a predetermined relationship achieved by the member relatively to said surface, and means controlled by said sensing means for retaining information identifying the position of said member at the time of occurrence of said predetermined relationship irrespective of change of level of said surface of liquid thereafter; and means providing from said station, at a delayed time following attainment by said member of said predetermined relationship, and while said information is retained by said information retaining means, signals indicative of said position of said member.

17. In combination, a plurality of signal originating stations, switching means, means providing an individual single transmitting channel comprising only two conductive paths between each of said stations and said switching means, means supplying power current through said switching means and transmitting channels selectively to said stations, means supplying control currents different from said power current through said switching means and the same transmitting channels selectively to said stations, and indicating means connected to said switching means, each of said originating stations including electrically operated means for sensing a condition thereat, electrically operated means for selectively providing signals from said sensing means through the same transmission channels and said switching means to said indicating means, said signals being indicative of the condition at the originating station sensed by said sensing means, and means directing said power current and said control currents to said sensing means and said signal providing means for effecting operation of said last-mentioned means under the control of said currents.

18. In combination, a plurality of signal originating stations, switching means, means providing an individual single transmitting channel comprising only two conductive paths between each of said stations and said switching means, means supplying power current through said switching means and transmitting channels both simultaneously and selectively to said stations, means supplying control currents different from said power current through said switching means and the same transmitting channels selectively to said stations, and indicating means connected to said switching means, each of said originating stations including electrically operated means for sensing a condition thereat, electrically operated means for selectively providing signals from said sensing means through the same transmission channels and said switching means to said indicating means, said signals being indicative of the condition at the originating station sensed by said sensing means, and means directing said power current and said control currents to said sensing means and said signal providing means for effecting operation of said last-mentioned means under the control of said currents whereby upon the simultaneous supply of said power current to each station, said power current effects operation of each of said sensing means simultaneously.

References Cited in the file of this patent
UNITED STATES PATENTS

| | | |
|---|---|---|
| 2,082,038 | West et al. | June 1, 1937 |
| 2,148,075 | Kiner | Feb. 21, 1939 |
| 2,567,823 | Needham | Sept. 11, 1951 |
| 2,627,660 | Smith | Feb. 10, 1953 |
| 2,669,875 | Wuensch et al. | Feb. 23, 1954 |
| 2,677,276 | Schmidt | May 4, 1954 |
| 2,729,101 | Wiley | Jan. 3, 1956 |
| 2,729,102 | Worth | Jan. 3, 1956 |